United States Patent
Haddad et al.

(10) Patent No.: US 12,348,522 B2
(45) Date of Patent: Jul. 1, 2025

(54) EXTENDED SECURITY SCHEME FOR REDUCING THE PREVALENCE OF BROKEN OBJECT LEVEL AUTHORIZATION

(71) Applicant: Cisco Technology, Inc., San Jose, CA (US)

(72) Inventors: Rami Haddad, Assendelft (NL); Rim El Malki, Palaiseau (FR); Daniel-Serban Cozma, Braila (RO); Hendrikus G. P. Bosch, Aalsmeer (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 264 days.

(21) Appl. No.: 18/056,977

(22) Filed: Nov. 18, 2022

(65) Prior Publication Data

US 2024/0098090 A1 Mar. 21, 2024

Related U.S. Application Data

(60) Provisional application No. 63/376,112, filed on Sep. 19, 2022.

(51) Int. Cl.
*G06F 21/00* (2013.01)
*H04L 9/40* (2022.01)

(52) U.S. Cl.
CPC .......... *H04L 63/101* (2013.01); *H04L 63/102* (2013.01); *H04L 63/105* (2013.01)

(58) Field of Classification Search
CPC .... H04L 63/101; H04L 63/102; H04L 63/105
See application file for complete search history.

(56) References Cited

U.S. PATENT DOCUMENTS

| | | | |
|---|---|---|---|
| 10,956,242 B1* | 3/2021 | Kumar | G06F 8/76 |
| 2003/0115487 A1* | 6/2003 | Andrews | H04L 63/105 726/4 |
| 2008/0109897 A1 | 5/2008 | Moran et al. | |
| 2010/0251340 A1 | 9/2010 | Martin et al. | |
| 2013/0238589 A1* | 9/2013 | Yarramreddy | G06F 21/604 707/709 |
| 2014/0109198 A1 | 4/2014 | Brown et al. | |
| 2015/0278243 A1 | 10/2015 | Vincent et al. | |
| 2016/0105408 A1* | 4/2016 | Cooper | H04L 63/08 726/3 |
| 2016/0373455 A1* | 12/2016 | Shokhrin | G06F 21/629 |
| 2020/0110584 A1* | 4/2020 | Irimescu | G06F 8/30 |

(Continued)

*Primary Examiner* — Michael M Lee
(74) *Attorney, Agent, or Firm* — Baker Botts L.L.P.

(57) ABSTRACT

A system and method for an extended security scheme for reducing the prevalence of broken object level authorization. In one embodiment, a method includes receiving code associated with an application programming interface (API), wherein the code includes one of an API definition and an API server stub, and parsing the code for one or more keywords associated with an extended security scheme. If the code includes the API definition, the method further includes generating an associated API server stub based on at least one of the one or more keywords and the API definition. If the code includes the API server stub, the method further includes generating an associated API definition based on at least one of the one or more keywords and the API server stub.

20 Claims, 4 Drawing Sheets

(56) References Cited

U.S. PATENT DOCUMENTS

2020/0153850 A1* 5/2020 Krishnan ............... H04L 63/101
2020/0396223 A1* 12/2020 Dube ...................... H04L 63/08
2022/0053000 A1   2/2022 Dube et al.
2022/0057999 A1* 2/2022 Pitchai Muthu ........ G06F 21/51

* cited by examiner

EXTENDED SECURITY SCHEME FOR REDUCING THE PREVALENCE OF BROKEN OBJECT LEVEL AUTHORIZATION

RELATED APPLICATION AND CLAIM TO PRIORITY

This application claims priority to U.S. Provisional Application No. 63/376,112 filed Sep. 19, 2022, and titled "Extended Security Scheme for Reducing the Prevalence of Broken Object Level Authorization," which is incorporated herein by reference.

TECHNICAL FIELD

The present disclosure relates generally to a field of computer security and, more particularly, to an extended security scheme for reducing the prevalence of broken object level authorization.

BACKGROUND

Broken Object Level Authorization (BOLA), also known as Insecure Direct Object References (IDOR), is a key security issue and is listed in the Open Web Application Security Project (OWASP) application programming interface (API) top 10 security/vulnerability issues list for API services. BOLA cases are cases where unauthorized users can access restricted objects implemented by an API service. BOLA is a symptom of sloppy programming: BOLA cases often occur when the programmer incorrectly programmed the object authorization code (if at all) for objects that are addressed. A common flaw in API design is the use of numbers as resource IDs; non-unique elements allow for guessing and present an initial flaw in object vulnerability. BOLA typically represents a large attack surface and proves to be difficult in its detection and mitigation given the lack of contextual knowledge of objects within the interface definition languages (IDLs), such as the OpenAPI Specification (OAS). The OAS does not describe objects, rendering an API service generated in accordance with the OAS unaware of objects' existence and their associated interactions with users, which presents an obstacle in the creation of an object-based permissioning model.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Figure 1:
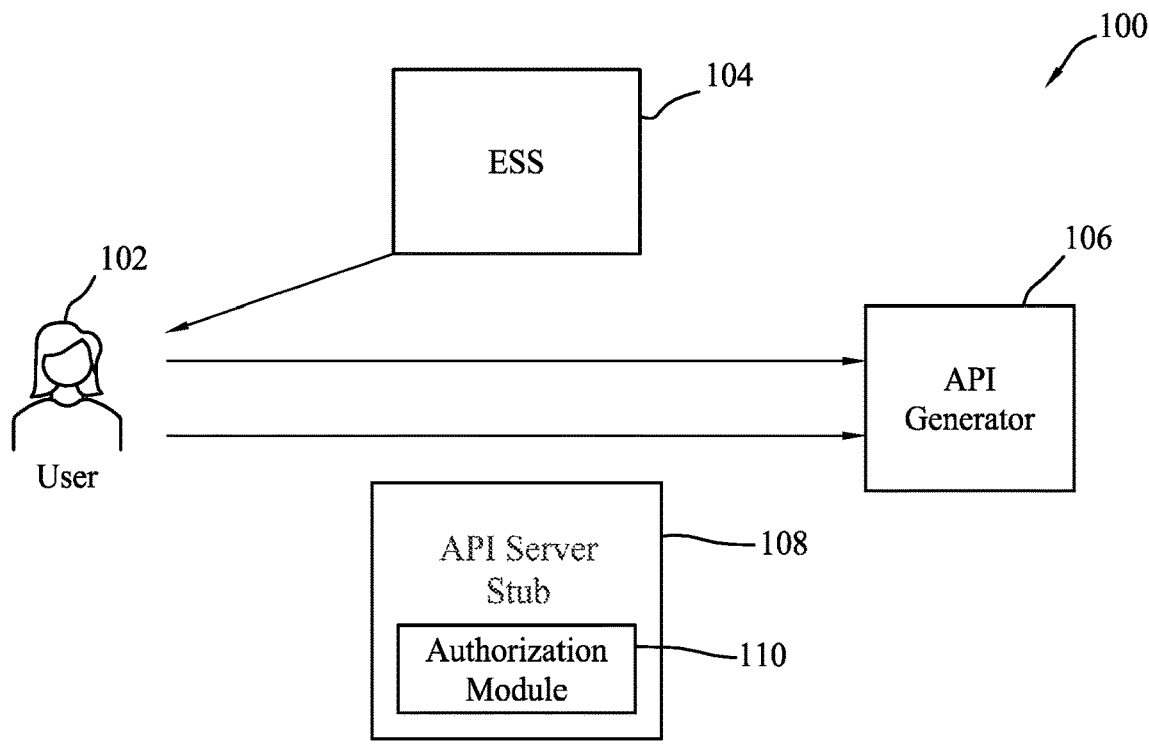
FIG. 1 illustrates an example system for an extended security scheme for reducing the prevalence of broken object level authorization, according to some embodiments of the present disclosure.

When building an application programming interface (API) service, a choice is presented to the developer to start with the API design by defining an API definition utilizing an interface definition language (IDL) (e.g., the OpenAPI Specification (OAS)) implementations, or to head straight to code development. In an API design-first approach, the effects of the proposed extended security scheme (ESS) may guide the developer in defining object authorization, effectively "auto-creating" access control lists (ACLs) and their associated objects/groups in a generated API server stub. Assuming a developer-first approach, where the API definition file (sometimes referred to as an API specification) is generated after the API service is coded, the proposed ESS documentation serves as a set of guiding principles for developers providing the capability of declarative-security controls for objects, with its complexity hidden in the root files of the programming environment. In summary, IDLs like the OAS need to provide and standardize an authorization capability to secure resources, such as objects, from unauthorized access. IDLs like the OAS also need additional methods to attain object-level knowledge and provide multi-user object authorization privileges. The disclosed systems and methods address these needs.

According to an embodiment, a method includes receiving code associated with an application programming interface (API), and the code includes one of an API definition and an API server stub; parsing the code for one or more keywords associated with an extended security scheme; if the code includes the API definition, generating an associated API server stub based on at least one of the one or more keywords and the API definition; and if the code includes the API server stub, generating an associated API definition based on at least one of the one or more keywords and the API server stub. In certain embodiments, the code includes instructions associated with object-level security features.

In some embodiments, generating the associated API server stub includes implementing an authorization module that is configured to automatically generate an access control list for objects created by calls to the associated API server stub during runtime. In certain embodiments, the method also includes detecting a call from a user to an object at the associated API server stub during runtime; checking an access control list for one or more user privileges associated with the object; and rejecting the call based on determining that the one or more user privileges does not include access to the object.

In certain embodiments, generating the associated API definition comprises generating an API definition file comprising the extended security scheme available for use in API development. In some cases, the extended security scheme is an object-level security scheme. In some embodiments, the extended security scheme includes a wrapper functions for generating an object privilege.

According to other embodiments, a system includes one or more processors and one or more computer-readable non-transitory storage media. The one or more computer-readable non-transitory storage media include instructions that, when executed by the one or more processors, cause the system to perform operations including receiving code associated with an API, and the code includes one of an API definition and an API server stub; parsing the code for one or more keywords associated with an extended security scheme; if the code includes the API definition, generating an associated API server stub based on at least one of the one or more keywords and the API definition; and if the code includes the API server stub, generating an associated API definition based on at least one of the one or more keywords and the API server stub.

According to yet another embodiment, one or more computer-readable non-transitory storage media embody instructions that, when executed by the processor, cause the processor to perform operations including receiving code associated with an API, and the code includes one of an API definition and an API server stub; parsing the code for one or more keywords associated with an extended security scheme; if the code includes the API definition, generating an associated API server stub based on at least one of the one or more keywords and the API definition; and if the code includes the API server stub, generating an associated API definition based on at least one of the one or more keywords and the API server stub.

Technical advantages of certain embodiments of this disclosure may include one or more of the following. A technical advantage of one embodiment may allow for the creation of APIs that are more secure against Broken Object Level Authorization (BOLA) vulnerabilities. Another technical advantage of one embodiment may allow for more efficient and effective implementation of object-level security mechanisms during API development. Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 2:
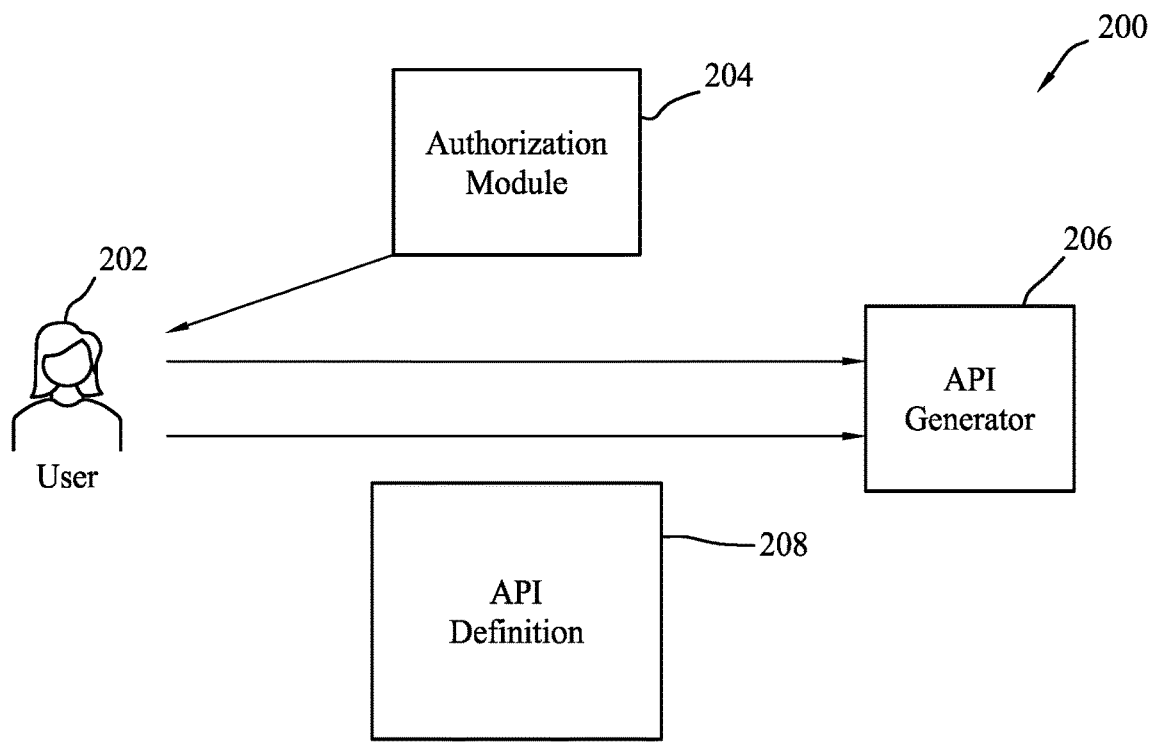
FIG. 2 illustrates an example system that provides an extended security scheme for reducing the prevalence of broken object level authorization, according to some embodiments of the present disclosure.
Figure 3:
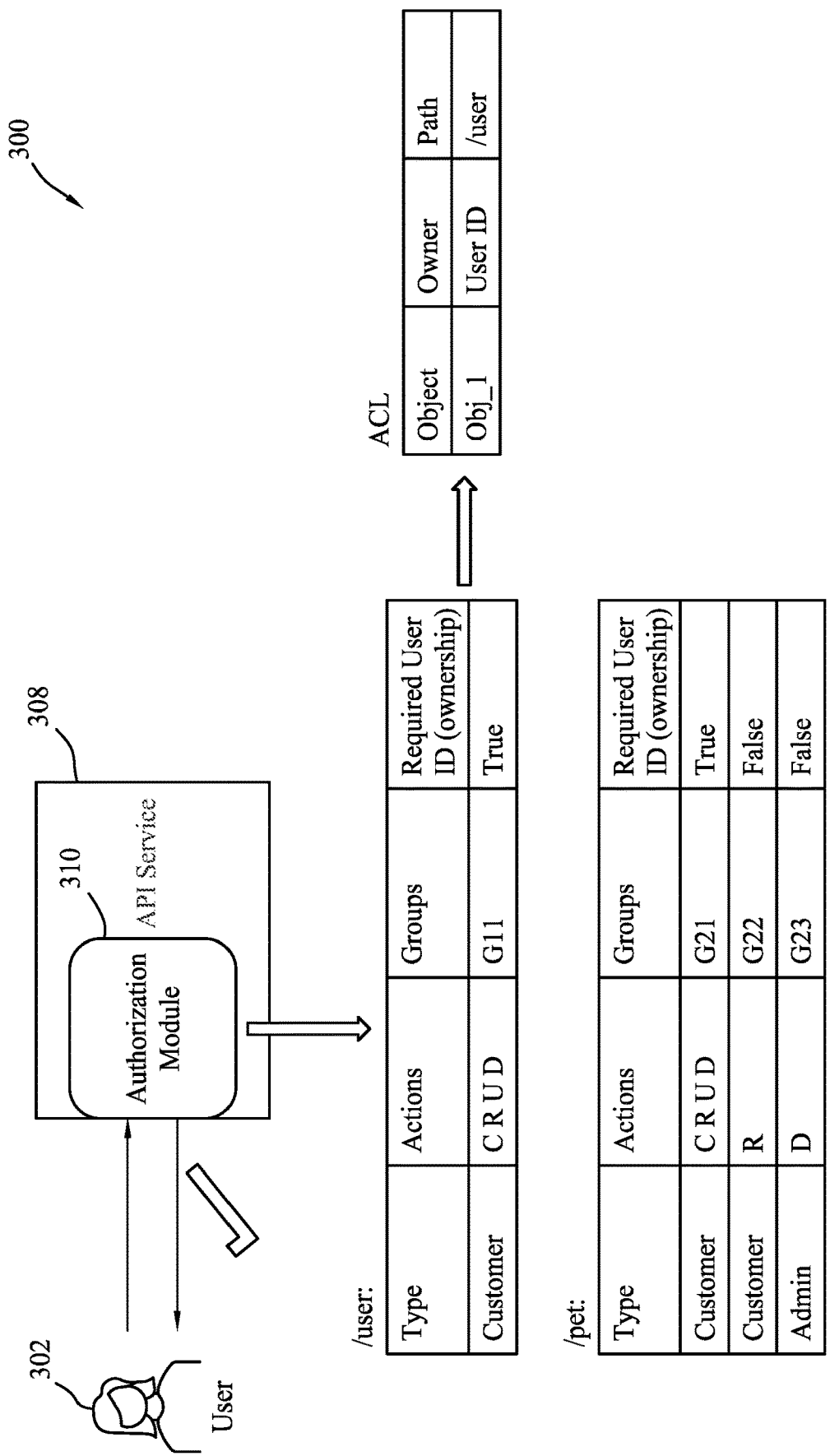
FIG. 3 illustrates an example system and access control list that provides an extended security scheme for reducing the prevalence of broken object level authorization, according to some embodiments of the present disclosure.
Figure 4:
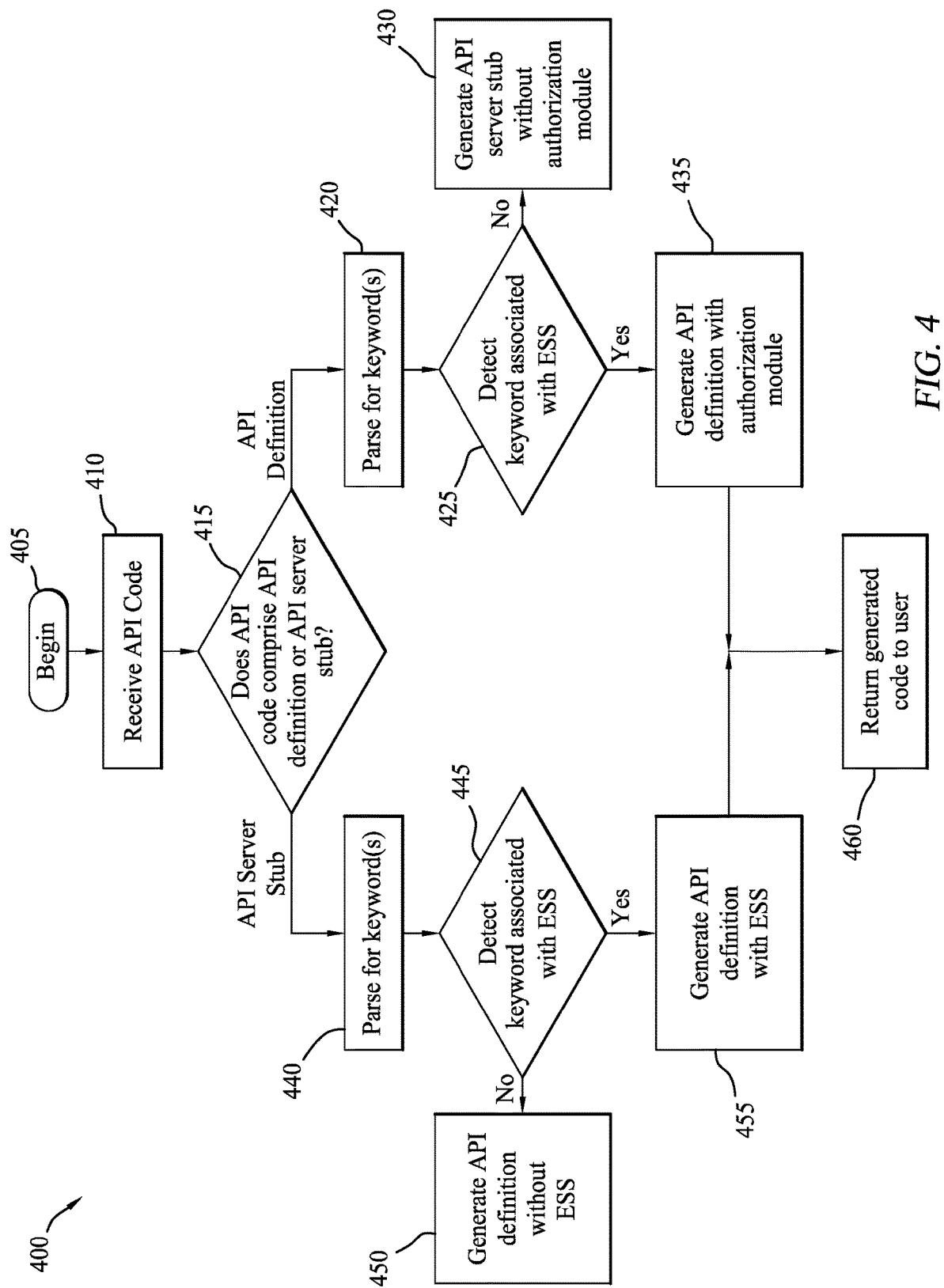
FIG. 4 illustrates an example method for an extended security scheme for reducing the prevalence of broken object level authorization, according to some embodiments of the present disclosure.
Figure 5:
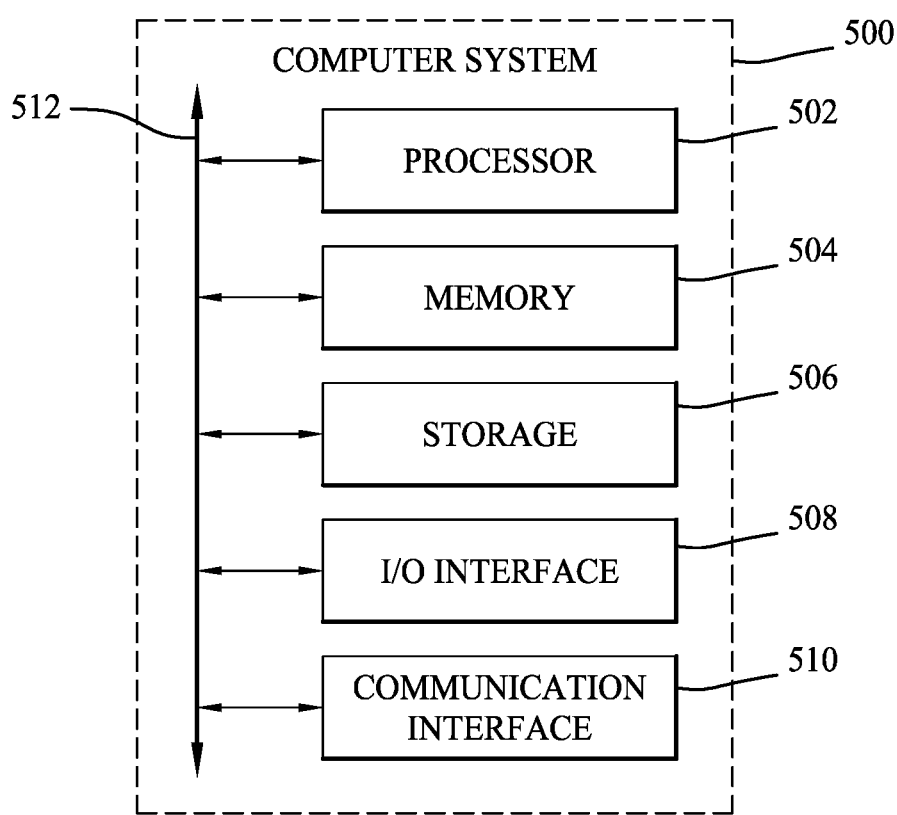
FIG. 5 illustrates an example of a computer system, according to some embodiments of the present disclosure.

This disclosure describes systems and methods for an extended security scheme for reducing the prevalence of broken object level authorization. FIG. 1 illustrates an example system for an extended security scheme for reducing the prevalence of broken object level authorization, in accordance with certain embodiments. FIG. 2 illustrates an example system for an extended security scheme for reducing the prevalence of broken object level authorization, in accordance with certain embodiments. FIG. 3 illustrates a system and access control list for an extended security scheme for reducing the prevalence of broken object level authorization, in accordance with certain embodiments. FIG. 4 illustrates an example method for an extended security scheme for reducing the prevalence of broken object level authorization, in accordance with certain embodiments. FIG. 5 illustrates an example of a computer system, in accordance with certain embodiments.

One key requirement for achieving strict security in any system is a deny-by-default access property where privileges are granted on a need-to basis per request, adhering to a security principle commonly known as the Principle of Least Privilege (PoLP). PoLP is a vetted industry standard today and remains the preferred access control approach; commercially, PoLP is referred to as the zero-trust model. Application Programming Interfaces (APIs) present a wide array of entry-points for malicious actors. Given the absence of standardized API security controls regarding users and objects metadata, it can be concluded that APIs do not adhere to the PoLP standard, leaving the data managed by the API service "at-risk." While many custom frameworks and third-party services exist to address object access control, there is no standardized native security property that handles declarative security coding of authentication and authorization functionalities for API objects. The OpenAPI Specification (OAS) outlines a standard for API design, including certain user authentication security properties. The OAS security scheme does not address object-level access control for users or groups, resulting in the absence of defined object-level authorization rules which leaves object metadata in a vulnerable state with a possible breach of data confidentiality. Based on this design, it can be concluded that the OAS does not adhere to the PoLP.

Achieving object-level authorization is hampered by the OAS's lack of object awareness at the design level. This trait is shared among all Interface Definition Languages (IDLs) and presents a flaw in terms of enforcing rules on API metadata, such as objects. Object permissioning requires a system-level awareness of objects and the existence of a security mechanism for object-level permissioning. IDLs such as the OAS are unaware of objects, leaving developers with no properly defined method to describe its attributes, including authorization. The current state of IDLs presents an issue in the design process of API security. On the other hand, the implementation and run-time environments are object aware.

A remodeled OAS based on OWASP C7 proactive control principles would favor clear object definitions and an authorization mechanism enforcing object access control. Following C7 proactive control principles in API design will be impactful at the development stage, where developer deficiency in security-knowledge most often results in the unintentional creation of attack vectors. Certain embodiments of this disclosure describe an extension to the OAS, called the OAS extended security scheme (ESS), which would standardize a mechanism that allows for object-based authorization in run-time through declarative security descriptions. An advantage of the ESS is that it removes the responsibility of authorization, and its associated complexity, from the developer and moves it to the background, exposing only declarative security controls to the developers.

Objects can be consumed by multiple users and groups of users requiring a paradigm that facilitates multi-level access control capabilities. A generic paradigm may utilize a combination of RBAC (Role-Based Access Control) and ABAC (Attribute-Based Access Control) properties. For instance, utilizing an Access Control List (ACL) bound to users/roles with a set of specific CRUD (Create, Read, Update, Delete) permissions would grant the least required privileges per operation and deny access by default to users/roles without the necessary permissions FIG. 1 is an illustration of an example system for an extended security scheme for reducing the prevalence of broken object level authorization, according to particular embodiments. The components of system 100 may include any suitable combination of hardware, firmware, and software. For example, the components of system 100 may use one or more elements of the computer system of FIG. 5. In the illustrated embodiment, system 100 includes user 102, extended security scheme (ESS) 104, API generator 106, API server stub 108, and authorization module 110.

User 102 represents a software developer, programmer, and the like that develops software code related to APIs. In designing an API, user 102 may take one of two approaches: a design-level approach and a code construction approach. In the design-level approach, user 102 may initiate the process of creating an API by building code from an interface definition language (IDL), such as the OpenAPI Specification (OAS). In the code construction approach, user 102 may directly develop the API code without the aid of an IDL.

When creating an API according to the design-level approach, user 102 may first initiate an API definition (also referred to as an API specification) file based on ESS 104. ESS 104 represents an IDL implementation that includes additional security features that may be implemented by user 102 to an API that user 102 develops. For example, ESS 104 may provide object-level security features to the OAS. User 102 may, for example, download an API definition file that operates according to the ESS 104 from an ESS module. The ESS module may represent any repository, database, server, or the like that is capable of storing and providing API definition files that operate according to the ESS 104. The ESS 104 may come with a toolset and documentation that enables user 102 to define object access control properties in design-time (e.g., within an API definition file).

The OAS is a standard that defines a design pattern for RESTful APIs (i.e., Representational State Transfer APIs) allowing both humans and computers to understand the capabilities of an API service without accessing the API source code. OAS describes the API's properties and features, such as available paths/directories, the request and response methods, and the employed security mechanisms. It can be written in YAML or JSON. The OAS provides a schema for API design allowing the developer to define the granular object access properties of the API and the specification's available security properties. The ESS 104 may cover a set of security properties that are not directly recognized by the currently-available public OAS generators.

There may, for example, be two designs of the ESS 104 that user 102 may follow when implementing the ESS 104 at the design stage of API development. In a first design, user 102 may define object security in the root-level 'securitySchemes' section of the OAS. Defining object security in the 'securitySchemes' may enable user 102 to apply the ESS 104 to the whole API (i.e., a global approach), as opposed to limiting the object security definitions to certain paths/operations, which is outlined in the second design example. To achieve object-level authorization for an entire API, the ESS 104 may introduce a new security scheme, which may be referred to, for example, as 'X-objectAuthScheme'. This security scheme may depend on and may be interoperable with the existing 'securitySchemes' available in OAS. For example, the ESS 104 may introduce the new security scheme (e.g., X-objectAuthScheme) within the 'components' section of OAS as shown below:

```
-- components:
    • schemas: {...}
    • securitySchemes:
        ○ api_key:
            ■ in: header
            ■ name: api_key
            ■ type: apiKey
        ○ X-objectAuthScheme:
            ■ type: apiKey
            ■ name: api_key
            ■ in: header
            ■ x-groups: string
            ■ x-user_id: string
```

As shown, the new security scheme introduced by the ESS 104 may include a number of properties, including the security scheme's type, name, and where the security scheme may be implemented. The ESS 104 may further introduce additional properties, such as a 'groups' property and a 'user_id' property. The ESS 104 (i.e., the X-objectAuthScheme) may be defined using the type apiKey, and it may use other types of security functions such as JSON web tokens. In this exemplary design of the ESS 104, the ESS 104 is implemented at the root level (i.e., the ESS 104 is globally defined in 'securitySchemes' and referenced in every path), which keeps security definitions at the root level of an API definition. The 'components' section in the OAS includes common definitions that are used by multiple API operations. To avoid duplication, these definitions may be defined globally in 'components' and are referenced using '$ref' (reusable definitions). An OAS generator, such as API generator 106, may require adjustments to recognize the ESS 104.

In an example of implementing ESS 104, user 102 may include 'X-objectAuth' for each object in components→schemas and 'X-objects' for each path to enforce object-level authorization. Such an implementation may comprise an API definition comprising:

```
--paths:
    • /pet:
        ○ post:
            ■ requestBody: {.....}
            ■ responses: {.....}
        ○ put:
            ■ requestBody: {.....}
            ■ responses: {.....}
        ○ x-objects:
            ■ $ref: '#/components/schemas/Pet/x-objectAuth'
-- components:
    • schemas:
        ○ pet:
            ■ type:
                • object
            ■ properties:
                • id:
                    ○ type: integer
                    ○ format: int64
                • name:
                    ○ type: string
                    ○ example: lucky
            ■ x-objectAuth:
                • object:
                    ○ $ref: '#/components/schemas/Pet/properties/id'
                • schema:
                    ○ $ref: '#/components/securitySchemes/X-
                        objectAuthScheme'
                • scopes:
                    ○ groups:
                        ■ $ref: '#/components/securitySchemes/X-
                            objectAuthScheme/x-groups'
                    ○ user_id:
                        ■ $ref: '#/components/securitySchemes/X-
                            objectAuthScheme/x-user_id'
                ○ methods:
                    ■ post:
                        • description: create an object
                    ■ put:
                        • description: modify/update an object
                    ■ get:
                        • description: read an object
                    ■ delete:
                        • description: delete an object
```

In a second design, user 102 may define object security according to the ESS 104 in the operation/method (method-level). Authorization checks in this design may be at the operation/method level. That is, in each path, authorization checks are included for each request type. Below is an example proposed design. 'X-objectAuth' may include three sub-categories: 'object', 'RW' (i.e., read/write) and 'R' (i.e., read). The first sub-category 'object' includes a reference to the identified object ($ref:' ... '). The object can be in the path (e.g., the URL), request body, and/or response body. In the 'RW' and 'R' sub-categories, the type of the authorization method and the user groups are listed.

```
--paths:
  • /pet:
    ○ post:
      ■ requestBody: {.....}
      ■ responses: {.....}
      ■ X-objectAuth:
        • object:
          ○ schema:
            ■ $ref:
            ■ 'post/responses/'201'/content/application/json/sche
              ma/properties/identifier'
        • RW:
          ○ token:
            ■ in: header
            ■ type: JWT
            ■ name: JSON web token
            ■ groups:
              ○ type: string
            ■ user_id:
            ■ type: string
        • R:
          ○ token:
            ■ in: header
            ■ type: JWT
            ■ name: JSON web token
            ■ groups:
              • type: string
            ■ user_id:
              • type: string
```

A modified version of the above design is shown below. The modified design differentiates between the different method types instead of only two (RW and R). The R and RW methods may be not sufficient to capture all request types, of which there are mainly four. For instance, an RW method can be an update (U) request, a delete (D) request, or a create (C) request.

```
--paths:
  • /pet:
    ○ post:
      ■ requestBody: {.....}
      ■ responses: {.....}
      ■ X-objectAuth:
        • object:
          ○ schema:
            ■ $ref:
            ■ 'post/responses/'201'/content/application/json/sche
              ma/properties/identifier'
        • token:
          ○ type: JWT
          ○ name: JSON web token
          ○ in: header
        • scopes:
          ○ C:
            ■ groups:
              • type: string
            ■ user_id:
              • type: string
          ○ R:
            ■ groups:
              • type: string
            ■ user_id:
              • type: string
          ○ U:
            ■ groups:
              • type: string
            ■ user_id:
              • type: string
          ○ D:
            ■ groups:
```
              • type: string
            ■ user_id:
              • type: string This method/operation-level design may result in redundant information across the specification, since 'X-objectAuth' may be multi-listed within every method in each path, creating duplicate information. Choosing root-level design or method-level design depends on the developer and the requirements of the API service.

After user 102 downloads or otherwise receives one or more API definition files associated with the ESS 104, user 102 may then describe a desired API service in the received one or more API definition files according to one or more schemes, including the ESS 104. User 102 may then send the API definition file to API generator 106. API generator 106 represents any suitable device, software, or system that is capable of parsing a received API definition and generating an API server stub based on the received API definition. API generator 106 may be an 'object-aware' mechanism that is introduced utilizing object identifiers. This mechanism may be implemented using the ESS 104 described herein, which, for example, introduces a new security scheme (e.g., 'X-objectAuth'). Using keywords associated with the ESS 104 in an API definition, or its corresponding authorization module function in a developed API server stub, user 102 may indicate to API generator 106 that API code compliant with the ESS 104 is to be generated. In some cases, API generator 106 may be used to prove the ability of enforcing code-level object authorization through declarative-programming. For example, API generator 106 may create an API server stub that implements the ESS 104 (i.e., implementing object-level security features) from an API definition that adheres to the ESS 104, and vice-versa.

After receiving an API definition from user 102, API generator 106 may then parse the definition file for one or more keywords associated with the ESS 104. For example, API generator 106 may parse the received API definition and retrieve the existing paths of the API definition and their HTTP verbs. API generator 106 may then check each path for the presence of a given keyword associated with the ESS 104 (e.g., 'X-objectAuth'), the presence of which indicates the decision to enforce object authorization. Subsequently, API generator 106 may then check if a security scheme related to the ESS 104 (e.g., 'X-objectAuthScheme') exists within the listed security schemes of the API definition. In case of such presence, API generator 106 may generate API server stub 108 and include authorization module 110 to API server stub. In doing so, API generator may generate API server stub based on the detected one or more keywords and the API definition.

API server stub 108 may, for example, implement the API-related functionalities, including the ESS 104, described by user 102 in the developed API definition when operated in runtime. Authorization module 110 represents any suitable device, software, or system that enforces authorization at the object level in API server stubs during runtime. Authorization module 110 may be an add-on feature that can be imported into any API server stub, service, or application. This module may automatically generate ACLs based on predefined rules. The predefined rules may be specific to each server stub, service, and application, and they may be based on user roles. An example embodiment of operation of ACLs as implemented by authorization module 110 is described below with reference to FIG. 3.

API generator 106 may then check the details (e.g., the properties) of the security scheme associated with the received ESS 104 (e.g., 'X-objectAuthScheme') and implement the security scheme in authorization module 110. API generator 106 may then send the generated API server stub to user 102, who may then test and/or deploy API server stub for runtime operation.

FIG. 2 is an illustration of an example system for an extended security scheme for reducing the prevalence of broken object level authorization, according to particular embodiments. The components of system 200 may include any suitable combination of hardware, firmware, and software. For example, the components of system 200 may use one or more elements of the computer system of FIG. 5. In the illustrated embodiment, system 100 includes user 202, authorization module 204, API generator 206, and API definition 208. As discussed above with reference to FIG. 1, a software developer may develop an API with the help of an IDL, such as the OAS, or the software developer may directly create the API without the help of an IDL.

In the latter case, user 202, the developer, may use software-development implementations designed to create API server stubs, and user 202 may implement object authorization from there to directly generate an API server stub with the ESS functionality without the help of an IDL. In such a case, user 202 may use authorization module 204. Authorization module 204 represents any suitable device, software, or system that enforces authorization at the object level in API server stubs during runtime. It may be an add-on feature that can be imported into any API server stub, service, or application. This module may automatically generate ACLs for objects created by calls to an API server stub during runtime based on predefined rules. The predefined rules may be specific to each service/application and based on user roles. User 202 may, for example, download authorization module 204 or resources associated with authorization module 204 from an external source. User 202 may then import authorization module 204 (or resources associated with authorization module 204) and develop API server stub code that implements the ESS. User 202 may then send (e.g., upload) the developed API service code to API generator 206.

API generator 206 represents any suitable device, program, or system that is capable of parsing received API service code for keywords associated with the ESS and generating an associated API definition based on the received API server stub code and one or more detected keywords. In addition to this functionality, API generator 206 may also implement the inverse functionality wherein the API generator 206 may parse a received API definition for keywords associated with the ESS and generate API service code based on the received API definition and one or more detected keywords, as described above with reference to FIG. 1.

Upon receiving the API service code from user 202, API generator 206 may then parse the API service code for one or more keywords associated with authorization module 204 and/or the ESS. For example, API generator 206 may parse the received API service code and iterate through the code's lines for the presence of a wrapper function associated with the ESS (e.g., the 'privilege provider generate object privilege' wrapper function) which may defined as a decorator for each existing path. In the case of such presence, API generator 206 may create a new security scheme (e.g., 'X-objectAuth') in an associated API definition generated by API generator 206 (e.g., API definition 208). API generator 206 may read the received API server stub to obtain the existence of the different properties associated with the ESS (e.g., group ID ('x-groups'), user ID ('x-user_id'), and where a web token (e.g., a JSON web token (JWT)) associated with ESS is located in API calls (e.g., in the body or header of a call)).

Upon detecting one of the one or more keywords, API generator 206 may generate API definition 208 (e.g., an API definition file) that reflects the API server stub developed by user 202. API definition 208 represents any API-related software or interface mechanism (e.g., an API definition file) that offers a design-level interface for creating an API. This generated API definition 208 may implement one or more security schemes associated with the ESS when, for example, a path of the received API server stub code includes code or instructions associated with authorization module 204 and/or the ESS. API generator 206 may then send the generated API definition 208 to user 202, who may then edit the API server stub code by modifying the generated API definition 208. User 202 may further implement and operate the API server stub during runtime.

FIG. 3 illustrates an example system and access control list (ACL) for an extended security scheme for reducing the prevalence of broken object level authorization, according to some embodiments. The components of system 300 may include any suitable combination of hardware, firmware, and software. For example, the components of system 300 may use one or more elements of the computer system of FIG. 5. In the illustrated embodiment, system 300 includes user 302, API service 308, and authorization module 310. API service 308 represents any API-related server stub operating in runtime that implements the security features of the ESS described herein.

In example embodiment of authorization module 310's function, authorization module 310 may grant user 302 a token that includes the user's name, unique ID, and group(s) after user 302 is authenticated by API service 308 (e.g., after user 302 logs in to API service 308 with a correct username and password). User 302's groups may be based on the type of user (e.g., customer or administrator) and may be path-based. This means that, for example, groups and their associated actions are listed for every path in API service 308. For example, API service 308 may have two paths ('/user' and '/pet'). In the '/user' path, users belonging to group 'G11' can create, read, update, and delete their own objects (since ownership is true/required). In the '/pet' path/directory, users belonging to group 'G21' are also able to create, read, update, and delete their own objects. Users belonging to group 'G22' can read any object in the '/pet' directory since object ownership is not required. Users belonging to group 'G23' can delete any object in the '/pet' directory since object ownership is not required. For each API service, a different set of rules are tailored by the API service's developers to match the functionality of the service and the type of users utilizing this service. Following successful authentication, user 302 can start interacting with API service 308 using HTTP queries.

In some cases, user 302 may make a POST call (i.e., an exemplary HTTP query) containing user 302's token to API service 308 in order to create an object in the path '/user'. Authorization module 310 may first examine the group ID included in the token and verify whether user 302 is able to create an object (i.e., make a POST) in the requested path. If this information is valid, authorization module 310 may extract the user ID (e.g., because the user ID may be required in a create process) from the token and create an entry in an access control list (ACL), which includes the object ID of the created object and the user ID of user 302. Next, user 302 may want to modify the created object by making a PUT call to API service 308. Again, authorization module 310 may examine the ACL to determine whether user 302 belongs to a group that is authorized to update objects in the path identified in the PUT call. If this information (e.g., the group ID) is not valid, then authorization module 310 may reject the call to edit the relevant object. If this information (e.g., the group ID) is valid, then authorization module 310 may examine the ownership requirement for that particular group. If ownership is required, then authorization module 310 may extract the user ID from the sent token and compare it to the user ID that is associated to the associated object ID in the ACL. If the user ID in the token matches the user ID in the ACL, then user 302 would be able to update the object associated with the PUT request because user 302 would be understood to be the owner of the object. If the user ID in the token does not match the user ID in the ACL, then user 302 would not be able to update the object associated with the PUT request. If ownership is false or not required, then user 302 would be able to update, read, and delete objects without being the owner of these objects. If user 302 belongs to two different groups (e.g., G21 and G22 in the path '/pet') that include the same action (e.g., Read (R)) but have different ownership requirements (e.g., one is true and the other is false), then false ownership overrides the true one. This is attributed to the fact that user 302 may be able to read, update, and/or delete any object in a specific directory including his or her own. Using this approach, authorization module 310 may automatically generate ACLs, thereby associating users with objects such that object-level security is achieved. The generated ACLs may be saved in permanent storage associated with API service 308 (e.g., in the server hosting API service 308) since APIs are stateless.

In some examples, read and read/write privileges are stored in an ACL format (for example, the previously-presented ACL design can be extended to include user IDs). An ACL in an API server stub may contain access control entries (ACE), which define the users' read and write privileges. Below is an example ACE, where an object with ID 11521 extends RW privileges to user ID 11231. User ID 123 happens may be the owner of this object, as every object is automatically assigned an owner (the creator of the object).

```
{
  "id": 152,
  "path": "/pets",
  "owner": "123",
  "users_ro": [ ],
  "users_rw": [
    "123"
  ]
}
```

FIG. 4 illustrates an example method for an extended security scheme for reducing the prevalence of broken object level authorization, according to some embodiments of the present disclosure. Method 400 begins at step 405. At step 410, API generator 106 receives API-related code from a user. The API-related code may comprise an API definition file, or in some cases the API-related code may comprise an API server stub (e.g., code related to an API service). In some cases, the API-related code comprises instructions associated with object-level security features (e.g., instructions associated with the extended security scheme (ESS) described herein).

At step 415, API generator 106 determines whether the API-related code comprises an API definition file or if it comprises an API server stub. In making this determination, for example, API generator 106 may parse the API-related code for the file type of the API-related code or it may parse the API-related code to check headers or other identifiers associated with the API-related code.

If the API-related code comprises an API definition, then, at step 420, API generator 106 parses the API definition for one or more keywords. In some cases, the one or more keywords are associated with the ESS (i.e., the one or more keywords are associated with an object-level security scheme). For example, API generator 106 may parse the API definition for keywords related to one or more security schemes implemented by the ESS, such as 'X-objectAuth.'

At step 425, API generator 106 determines if it has detected at least one of the keywords associated with an object-level security scheme (e.g., the ESS). If no such keyword is detected, then at step 430 API generator 106 generates an associated API server stub without an authorization module. If such a keyword is detected, then at step 435 API generator 106 generates an associated API server stub based on at least one or the one or more keywords and the received API definition. The associated API server stub may include an authorization module. The authorization module may implement access control list (ACL) functionality in the associated API server stub such that the associated API server stub includes object-level security as described in FIGS. 1-3 above. For example, the authorization module may be configured to automatically generate an ACL for objects created by a call to the associated API server stub during runtimes.

If the API-related code comprises an API server stub, then, at step 440, API generator 106 parses the API server stub for one or more keywords. In some cases, the one or more keywords are associated with the ESS (i.e., the one or more keywords are associated with an object-level security scheme). For example, API generator 106 may parse the API server stub for keywords related to a wrapper function associated with the ESS (e.g., the 'privilege provider generate object privilege' wrapper function) that, for example, generates object privileges.

At step 445, API generator 106 determines if it has detected at least one of the keywords associated with an object-level security scheme (e.g., the ESS). If no such keyword is detected, then, at step 450, API generator 106 generates an associated API definition file that does not include an object-level security scheme. If such a keyword is detected, then at step 455 API generator 106 generates an associated API definition based on at least of the one or more keywords and the received API server stub. The associated API definition may include one or more object-level security schemes (e.g., according to the ESS) that may be available to the user for API development as described in FIGS. 1-3 above.

At step 460, API generator 106 returns the generated code to the user. If the generated code comprises the associated API server stub (e.g., as described in step 435), then the API generator 106 returns the associated API server stub to the user. If the generated code comprises the associated API definition (e.g., as described in step 455), then the API generator 106 returns the associated API definition to the user.

The various embodiments described herein outline the BOLA issue in API services. Objects and their related permissions are not properly defined in modern IDLs such as the OAS. To overcome this limitation, various embodiments herein describe an ESS that adds object-level permission to IDLs such as the OAS. The ESS may be implemented at the root level of an API definition, where declarative security properties may be defined globally and reused by multiple API operations. The ESS may also be implemented at the method level, where object-level authorization is defined at each method in each path/directory. Further, an API generator is described herein, which may generate an API server stub by taking an API definition/specification as input, and the generator may generate an API definition by taking an API server stub (e.g., Flask/FastAPI) as input, while recognizing the added ESS design in the received code and in the OAS. Further, an authorization module, which automatically generates ACLs based on user groups and user IDs, is described herein.

FIG. 5 illustrates an example of a computer system, in accordance with certain embodiments. In particular embodiments, one or more computer systems 500 provide functionality described or illustrated herein. As an example, one or more computer systems 500 may be used to provide at least a portion of an extended security scheme 104, API generator 106, API server stub 108, or authorization module 110 described with respect to FIG. 1, or an authorization module 204, API generator 206, or API definition 208 described with respect to FIG. 2. As yet another example, one or more computer systems 500 may be used to perform one or more steps described with respect to FIG. 4. In particular embodiments, software running on one or more computer systems 500 provides functionality described or illustrated herein or performs one or more steps of one or more methods described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example, and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A method for providing an extended security scheme for reducing prevalence of broken object level authorization for a user, comprising:
   receiving, by an application programming interface (API) generator, code associated with an API received from the user, wherein the code comprises one of an API definition and an API server stub;
   parsing, by the API generator, the code for one or more keywords associated with the extended security scheme;
   if the code comprises the API definition, generating, by the API generator, an associated API server stub based on at least one of the one or more keywords and the API definition, wherein the associated API server stub implements the extended security scheme;
   if the code comprises the API server stub, generating, by the API generator, an associated API definition based on at least one of the one or more keywords and the API server stub, wherein the associated API definition implements the extended security scheme; and
   transmitting, by the API generator, the associated API server stub or the associated API definition to the user.

2. The method of claim 1, wherein the code comprises instructions associated with object-level security features.

3. The method of claim 1, wherein generating the associated API server stub comprises implementing an authorization module that is configured to automatically generate an access control list for objects created by calls to the associated API server stub during runtime.

4. The method of claim 1, further comprising:
   detecting a call from the user to an object at the associated API server stub during runtime;
   checking an access control list for one or more user privileges associated with the object; and
   rejecting the call based on determining that the one or more user privileges does not include access to the object.

5. The method of claim 1, wherein generating the associated API definition comprises generating an API definition file comprising the extended security scheme available for use in API development.

6. The method of claim 1, wherein the extended security scheme is an object-level security scheme.

7. The method of claim 1, wherein the extended security scheme comprises a wrapper function for generating an object privilege.

8. A system for providing an extended security scheme for reducing prevalence of broken object level authorization for a user, comprising:
   one or more processors; and
   one or more non-transitory computer-readable storage media comprising instructions that, when executed by the one or more processors, cause one or more components of the system to perform operations comprising:
      receiving, by an application programming interface (API) generator, code associated with an API received from the user, wherein the code comprises one of an API definition and an API server stub;
      parsing, by the API generator, the code for one or more keywords associated with the extended security scheme;

if the code comprises the API definition, generating, by the API generator, an associated API server stub based on at least one of the one or more keywords and the API definition, wherein the associated API server stub implements the extended security scheme;

if the code comprises the API server stub, generating, by the API generator, an associated API definition based on at least one of the one or more keywords and the API server stub, wherein the associated API definition implements the extended security scheme; and transmitting, by the API generator, the associated API server stub or the associated API definition to the user.

9. The system of claim 8, wherein the code comprises instructions associated with object-level security features.

10. The system of claim 8, wherein generating the associated API server stub comprises implementing an authorization module that is configured to automatically generate an access control list for objects created by calls to the associated API server stub during runtime.

11. The system of claim 8, further comprising:
detecting a call from the user to an object at the associated API server stub during runtime;
checking an access control list for one or more user privileges associated with the object; and
rejecting the call based on determining that the one or more user privileges does not include access to the object.

12. The system of claim 8, wherein generating the associated API definition comprises generating an API definition file comprising the extended security scheme available for use in API development.

13. The system of claim 8, wherein the extended security scheme is an object-level security scheme.

14. The system of claim 8, wherein the extended security scheme comprises a wrapper function for generating an object privilege.

15. One or more non-transitory computer-readable storage media embodying instructions for providing an extended security scheme for reducing prevalence of broken object level authorization for a user, the instructions when executed by a processor, cause performance of operations comprising:
receiving, by an application programming interface (API) generator, code associated with an API received from the user, wherein the code comprises one of an API definition and an API server stub;
parsing, by the API generator, the code for one or more keywords associated with the extended security scheme;
if the code comprises the API definition, generating, by the API generator, an associated API server stub based on at least one of the one or more keywords and the API definition, wherein the associated API server stub implements the extended security scheme;
if the code comprises the API server stub, generating, by the API generator, an associated API definition based on at least one of the one or more keywords and the API server stub, wherein the associated API definition implements the extended security scheme; and
transmitting, by the API generator, the associated API server stub or the associated API definition to the user.

16. The one or more non-transitory computer-readable storage media of claim 15, wherein the code comprises instructions associated with object-level security features.

17. The one or more non-transitory computer readable storage media of claim 15, wherein generating the associated API server stub comprises implementing an authorization module that is configured to automatically generate an access control list for objects created by calls to the associated API server stub during runtime.

18. The one or more non-transitory computer-readable storage media of claim 15, the operations further comprising:
detecting a call from the user to an object at the associated API server stub during runtime;
checking an access control list for one or more user privileges associated with the object; and
rejecting the call based on determining that the one or more user privileges does not include access to the object.

19. The one or more non-transitory computer-readable storage media of claim 15, wherein generating the associated API definition comprises generating an API definition file comprising the extended security scheme available for use in API development.

20. The one or more non-transitory computer readable storage media of claim 15, wherein the extended security scheme is an object-level security scheme.

* * * * *